(12) United States Patent
Fujita et al.

(10) Patent No.: US 7,867,123 B2
(45) Date of Patent: Jan. 11, 2011

(54) DRIVE APPARATUS FOR AN EXTRUDER

(75) Inventors: Yasufumi Fujita, Hiroshima (JP); Yukio Fukuchi, Hiroshima (JP); Junichi Iwai, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 370 days.

(21) Appl. No.: 11/704,946

(22) Filed: Feb. 12, 2007

(65) Prior Publication Data

US 2007/0191169 A1 Aug. 16, 2007

(30) Foreign Application Priority Data

Feb. 13, 2006 (JP) .......................... P2006-035361

(51) Int. Cl.
*F16H 3/72* (2006.01)
(52) U.S. Cl. ............................ 475/5; 475/218; 475/329
(58) Field of Classification Search ................. 475/3–5, 475/7, 10, 214, 215, 218, 329, 207; 366/83–86, 366/297, 301
See application file for complete search history.

(56) References Cited

U.S. PATENT DOCUMENTS

| | | | | |
|---|---|---|---|---|
| 2,235,420 A | * | 3/1941 | Cory | 475/207 |
| 2,469,881 A | * | 5/1949 | Laubach et al. | 74/334 |
| 3,376,757 A | * | 4/1968 | Papa, Jr. | 74/370 |
| 6,190,280 B1 | * | 2/2001 | Horsch | 475/209 |
| 6,344,008 B1 | * | 2/2002 | Nagano et al. | 475/1 |
| 6,565,471 B2 | * | 5/2003 | Weeramantry et al. | 475/80 |
| 6,793,600 B2 | * | 9/2004 | Hiraiwa | 475/5 |
| 7,195,573 B2 | * | 3/2007 | Bezian et al. | 475/5 |
| 2001/0008372 A1 | * | 7/2001 | Yagi et al. | 318/640 |
| 2008/0009379 A1 | * | 1/2008 | Steinwender | 475/5 |
| 2008/0039257 A1 | * | 2/2008 | Holmes | 475/5 |

FOREIGN PATENT DOCUMENTS

JP 2001-191392 A 7/2001

* cited by examiner

*Primary Examiner*—David D Le
*Assistant Examiner*—Justin Holmes
(74) *Attorney, Agent, or Firm*—Sughrue Mion, PLLC

(57) ABSTRACT

A drive apparatus for an extruder includes a speed reduction mechanism unit and an output distributing mechanism unit separated from each other. The speed reduction mechanism unit is a planetary gear speed reduction mechanism including a hollow gear connected in mesh with a main input shaft through a plurality of gears giving a selectively variable speed change ratio and located on the outer periphery, a supporting shaft of a sun gear which constitutes an auxiliary input shaft, and a planetary frame of planetary gears which constitutes an output shaft, wherein the speed reduction mechanism unit and the output distributing mechanism unit are connected to each other by only an output shaft joint, and the main motor or auxiliary motor is selected by a switching lever to widen the running range of the motors.

6 Claims, 3 Drawing Sheets

II-II SECTION

DRIVE APPARATUS FOR AN EXTRUDER

This application claims priority from Japanese Patent Application No. 2006-035361, filed on Feb. 13, 2006, the entire subject matter of which is incorporated herein by reference.

BACKGROUND OF THE INVENTION

1. Field of the Invention

The present invention relates to a drive apparatus for an extruder, which is a large-scale multiple-shaft screw type extruder for melting, kneading, and extruding synthetic resin material. More particularly, the present invention relates to an improvement in realizing the operation over a wide range of screw rotary speeds by a switching lever at the primary motor, allowing a high speed and a low speed running.

2. Description of the Related Art

Generally, a synthetic resin material is melted, kneaded, and extruded by a screw type extruder in order to carry out kneading/mixing for improving quality or physical properties the synthetic resin material after compounding reaction or reaction treatment such as regeneration. A multiple-shaft (usually two shafts) screw type extruder, which has excellent kneading function, has been adopted for the screw type extruder so that the size thereof increases. As the size of such a twin screw type extruder increases, a size of a drive apparatus for an extruder also increases. The drive apparatus includes a speed reduction mechanism unit and an output distributing mechanism unit. The speed reduction mechanism is designed to be able to change its speed such that the screw type extruder can change its rotary speed for different materials or changes in the physical property of the material. Each of the speed reduction mechanism and the output distributing mechanism unit comprises a large number of gears and gear shafts. Such drive apparatus has large overall size and weight as compared with the body of the twin screw type extruder.

As a countermeasure against increasing the size of the drive apparatus, adoption of a planetary gear speed reduction mechanism for the speed reduction mechanism unit has been proposed in order to reduce the size. Namely, JP-A-2001-1913921 discloses a configuration in which the speed reduction mechanism unit includes a planetary gear speed reduction mechanism at a front stage and a parallel-shaft gear speed reduction mechanism at a rear stage, wherein the planetary gear speed reduction mechanism and the parallel-shaft gear speed reduction mechanism are arranged in series and integrated to the output distributing mechanism unit. In the planetary gear speed reduction mechanism at the front stage, a main motor with a constant speed is connected to the supporting shaft of a sun gear through a gear connector, an auxiliary motor with variable speed is connected through a plurality of gears to the outer wall of a hollow gear, which has gear teeth on its inner and outer walls and is rotatably supported, and a pinion holder for the planetary gear is connected to an input shaft of a parallel shaft gear speed reduction mechanism at the rear stage through another gear connector. At the rear stage, an output shaft of the parallel shaft gear speed reduction mechanism, which is driven by a set of speed reduction gears, constitutes a main output shaft of the output distributing mechanism. A plurality of sets of speed reduction gears for the parallel shaft gear speed reduction mechanism are prepared, and can be interchanged in order to change the speed reduction ratio as needed.

Related drive apparatus configured as described above presents the following problems. The speed reduction mechanism unit is composed of two stages of speed reduction mechanisms. Thus, the size of the drive apparatus increases such that a large installing space may be required. Further, the speed reduction mechanism unit and the output distributing mechanism unit are integrated to each other. In the case of such a large machine, transportation for delivery becomes difficult because of the overall size and weight. The driver may be delivered in a state dismantled by frame division and reassembled at an installing place. However, reassembling of the gear machine requires a very sophisticated technique. Thus, it is difficult to reassemble the gear machine at the installing place.

SUMMARY OF THE INVENTION

A drive apparatus for an extruder according to a first aspect of the present invention comprises: a speed reduction mechanism unit comprising a planetary gear speed reduction mechanism, the planetary gear speed reduction mechanism including: a hollow gear connected in mesh with a main input shaft connected to a main motor on the outer periphery of the planetary gear speed reduction mechanism unit through a plurality of gears having a selectively variable speed change ratio; a supporting shaft of a sun gear which constitutes an auxiliary input shaft connected to an auxiliary motor; and a planetary frame of planetary gears which constitutes an output shaft, and the speed reduction mechanism unit; and an output distributing mechanism unit separated from the speed reduction mechanism unit; and an output shaft joint connecting the speed reduction mechanism unit and the output distributing mechanism unit.

According to a second aspect of the invention, in the drive apparatus, two gears belonging to the main input shaft and the intermediate gear shaft, respectively, are located in a mesh state, and the intermediate gear shaft is connected to the two gears by a switching cam mechanism having a switching lever such that intermediate gear shaft is capable to being fixed to or released from the two gears. According to a third aspect of the invention, the two gears are spline-connected to the intermediate gear shaft such that they are movable in a shaft direction thereof. According to a fourth aspect of the invention, the output shaft joint connects the output shaft of the speed reduction mechanism unit and the output distributing mechanism unit. According to a fifth aspect of the invention, the output distributing mechanism unit comprises a main driving shaft, and the output shaft joint connects the output shaft of the speed reduction mechanism unit and the main driving shaft of the output distributing mechanism unit. According to a sixth aspect of the invention, the speed reduction mechanism unit further comprises a speed ration changing mechanism, the speed ration changing mechanism including: the main input shaft having at least two main input gears, each main input gears integrating with the main input shaft; an intermediate gear shaft connected in mesh with the hollow gear and having at least two intermediate gears, each intermediate gears meshing with respective main input gears so as to form at least two pairs of meshed gears; a switching cam mechanism for selectively integrating one intermediate gear with the intermediate gear shaft; and a switching lever connected to the switching cam, wherein each pair of meshed gears has different gear ratio. According to a seventh aspect of the invention, the at least two pairs of meshed gears are spline-connected to the intermediate gear shaft such that they are movable in a shaft direction thereof. According to an eight aspect of the invention, the speed ration changing mechanism is provided outside the planetary gear system speed reduction mechanism.

The drive apparatus configured as described above has following advantages. A switching lever is provided on the main motor with a constant speed so as to change a high speed and a low speed running. Thus, the driver can be operated in a wider range of screw rotary speed than a related configuration. When the driver is applied to a compounding machine, the rotary speed can be easily changed according to the grade of a material. Accordingly, optimum operation of the driver can be obtained.

Further, the speed reduction mechanism unit and the output distributing mechanism unit are separated from each other. Accordingly, the outer size and weight of each unit are reduced as compared with the case where they are integrated. Thus, these units can be easily transported.

DETAILED DESCRIPTION OF THE PREFERRED EMBODIMENTS

An object of the present invention is to provide a drive apparatus for an extruder which is downsized and is capable of realizing the operation over a wide range of screw rotary speed by a switching lever at the primary motor, allowing a high speed and a low speed running.

Figure 1:
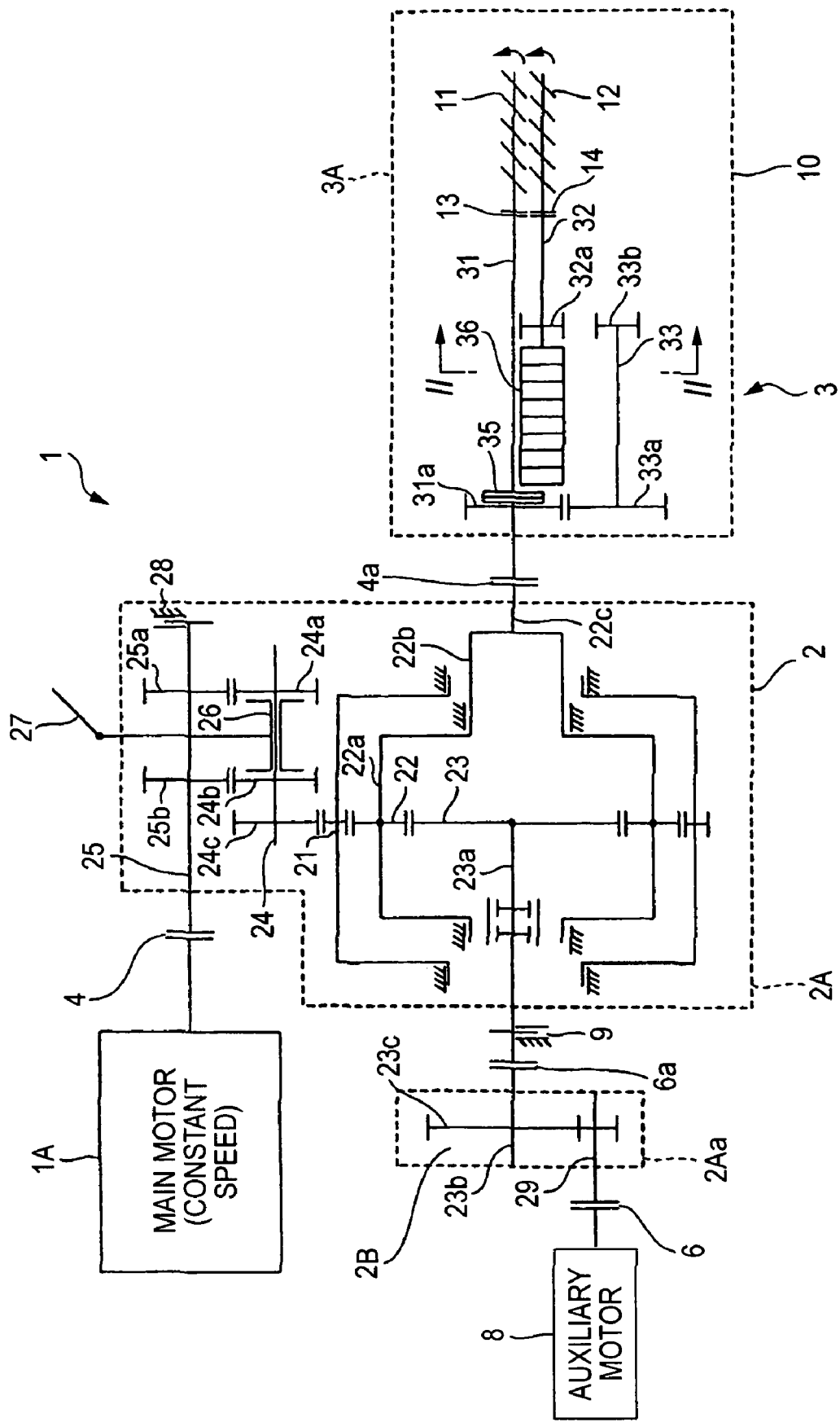
FIG. 1 shows an arrangement view of a drive apparatus for an extruder according to the present invention.

A preferred embodiment of the drive apparatus according to the present invention will be described with reference to the drawings. In FIG. 1, an drive apparatus for an extruder 1 includes a speed reduction mechanism unit 2 having a main motor 1A, a preliminary speed reduction mechanism 2B and an auxiliary motor 8, which are connected through a first, a second and a third shaft joint 4, 6, 6a; an output distributing mechanism unit 3 for a twin screw type extruder 10; and an output joint shaft 4a. The speed reduction mechanism unit 2 further includes a planetary gear speed reduction mechanism and a speed reduction ratio changing mechanism.

The planetary gear speed reduction mechanism of the speed reduction mechanism unit 2 includes a hollow gear 21, a plurality of planetary gears 22, a planetary frame 22a and a sun gear 23. The hollow gear 21 has gears formed on the inner and outer walls and is rotatably supported around a center of a shaft by a speed reduction mechanism casing 2A. The plurality of (usually three) planetary gears 22 are arranged at regular intervals so as to mesh with the internal gear teeth of the hollow gear 21. The planetary frame 22a supports these planetary gears 22 such that they can rotate about their respective shafts, and is supported by the speed reduction mechanism casing in order to rotate around a center of the shaft of the planetary frame 22a. The end 22b on the output side of planetary frame 22a constitutes an output shaft. The sun gear 23 is arranged within the planetary frame 22a, which meshes with all the planetary gears 22, is rotatably supported by a supporting shaft 23a attached to the center of the shaft by the speed reduction mechanism casing. The end 23b on the input side of supporting shaft 23a constitutes an auxiliary input shaft. Incidentally the center of the shaft of the hollow gear 21 and planetary frame 22a is coincident with that of the sun gear 23, and the center of the shaft of each of the planetary gears 22 is in parallel to that of the sun gear 23.

In FIG. 1, the output side end 22b of the planetary frame 22a is integrally formed with the output gear shaft 22c. The output gear shaft 22c protrudes from the speed reduction mechanism casing 2A toward the output distributing mechanism unit 3, that is, the output side of the speed reduction mechanism, to constitute an output shaft. The input side end 23b of the sun gear 23 is connected to the preliminary speed reduction mechanism 2B. The preliminary speed reduction mechanism 2B is housed in another casing 2Aa, which is distinct from the speed reduction mechanism casing 2A, through an auxiliary input locking device 9 and the third shaft joint 6a. The preliminary speed reduction mechanism 2B is connected to the auxiliary motor 8 through the second shaft joint 6.

Outside the above planetary gear system speed reduction mechanism, the speed ratio changing mechanism of the speed reduction mechanism unit 2 includes an intermediate gear shaft 24 and main input shaft 25 that are arranged in parallel to the center of the shaft of the hollow gear 21; three gears including a first intermediate gears 24a, a second intermediate gear 24b, and a third intermediate gear 24c arranged to have a predetermined distance there among and mounted on the intermediate gear shaft 24; two gears including a first main input gear 25a and a second main input gear 25b mounted on the main input shaft 25; a switching cam mechanism 26 arranged between the first intermediate gear 24a and second intermediate gear 24b of the intermediate gear shaft 24; and a switching lever 27 connected to the switching cam 26 and protruding outwardly from the speed reduction mechanism casing 2A.

At the intermediate gear shaft 24, the third intermediate gear 24c is integrated with the intermediate gear shaft 24 and connected in mesh with the external gear teeth of the hollow gear 21. The first intermediate gear 24a and second intermediate gear 24b are fixed in their shaft position to the intermediate gear shaft. However, normally, they are not integrated therewith. By the switching cam mechanism 26 operated by the switching lever 27, either one of them is selectively integrated with the intermediate gear shaft 24.

At the main input gear shaft 25, the first main input gear 25a and second main input gear 25b are arranged in mesh with the first intermediate gear 24a and second intermediate gear 24b, respectively, and are integrated with the main input gear shaft 25. The first intermediate gear 24a and first main input gear 25a in mesh with each other and the second intermediate gear 24b and second main input gear 25b in mesh with each other are designed to have different gear ratios, that is, speed reduction ratios. In FIG. 1, although two pairs of meshed gears with each other having different gear ratios are illustrated, the number of the pairs of gears should not be limited to two pairs. They may be three or more pairs considering the characteristics of the auxiliary motor 8 which will be described later. In the main input shaft 25, an input side end opposite to the output side end projects from the speed reduction mechanism casing, and a main input locking device 28 is located at another end.

At the intermediate gear shaft 24, the means for selecting either the first intermediate gear 24a or second intermediate gear 24b in the intermediate gear shaft 24 to be in a power transmitting state with the main input shaft 25 should not be limited to the switching cam mechanism 26 illustrated in FIG. 1. For example, the first intermediate gear 24a and second intermediate gear 24b may be spline-connected to the intermediate gear shaft 24 so that the first intermediate gear 24a and second intermediate gear 24b are movable in the shaft direction of the intermediate gear shaft 24. Such a configuration can also give the same function. By the switching lever 27, the first intermediate gear 24a and second intermediate gear 24b may be individually moved such that only one gear is located in a mesh state. Alternatively, the first main input gear 25a and the second main input gear 25b may be fixed away from each other by a predetermined interval so that they do not simultaneously mesh, and may be moved simultaneously so that only one is located in the mesh state.

The output distributing mechanism unit 3 includes a main driving shaft 31, a subsidiary driving shaft 32, an intermediate driving shaft 33, a plurality of gears, a main driving shaft thrust bearing 35 and a subsidiary driving shaft thrust bearing 36 that are housed in a distributor casing 3A. The main driving shaft 31 is rotatably supported together with the main driving shaft thrust bearing 35 housed in the distributor casing 3A. Both ends thereof protrude from the distributor casing. The input side end thereof protrudes outwardly through the outer wall of the distributor casing 3A so as to constitute the input shaft, and the output side end constitutes a main driving output shaft. A first driving gear 31a is integrally formed onto the input side of the distributor casing. The subsidiary driving shaft 32 is arranged in parallel to the main driving shaft 31, separated by the same distance as are the two screws of the twin screw type extruder and rotatably supported by the distributor casing 3A. The output side end of the subsidiary driving shaft 32 protrudes from the distributor casing 3A toward the output side like the main driving shaft 31 so as to constitute a subsidiary driving output shaft. The other end is supported by the subsidiary driving shaft thrust bearing 36 within the distributor casing 3A. In front of the subsidiary driving shaft thrust bearing 36, a fourth driving gear 32a is integrated with the subsidiary driving shaft 32.

The intermediate driving shaft 33 is arranged in parallel to the main driving shaft 31 and subsidiary driving shaft 32 and rotatably supported by the distributor casing 3A. At the input side end of intermediate driving shaft 33, a second driving gear 33a in mesh with the first driving gear 31a is integrated. At the output side end of intermediate driving shaft 33, a third driving gear 33b corresponding to the above fourth driving gear 32a is integrated. The first driving gear 31a and second driving gear 33a have the same number of teeth and the third driving gear 33b and fourth driving gear 32a also have the same number of teeth. It should noted that the third driving gear 33b and fourth driving gear 32a cannot mesh with each other in structure because they are constrained to be at the same interval as that between the two screws of the twin screw type extruder.

Figure 2:
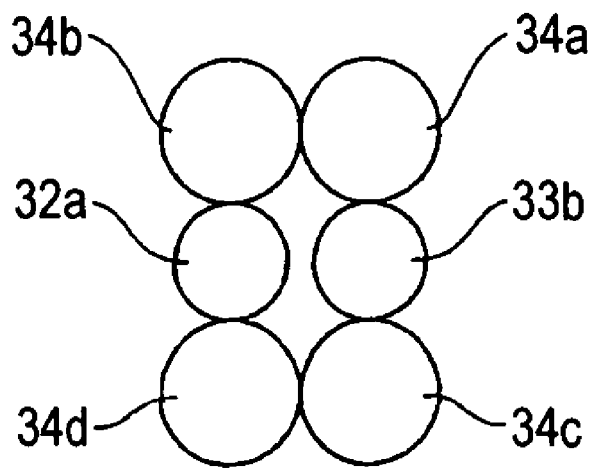
FIG. 2 shows a view taken along a line II-II in FIG. 1 and showing the mesh-connection state among a third driving gear, a fourth driving gear and four driving intermediate gears.

As seen from FIG. 2 which shows the case where two screws are rotationally driven in the same direction, the third driving gear 33b and fourth driving gear 32a are connected in mesh with each other through total four gears (two on each of the upper and lower sides) consisting of a first driving intermediate gear 34a, a second driving intermediate gear 34b, a third driving intermediate gear 34c, a fourth driving intermediate gear 34d. Here, at least the first driving intermediate gear 34a and second driving intermediate gear 34b have the same number of teeth and the third driving intermediate gear 34c and fourth driving intermediate gear 34d have the same number of teeth. Incidentally, where the two screws are rotationally driven in different directions, the fourth driving gear 32a and third driving gear 33b are connected with each other through an odd number of intermediate gears.

The speed reduction mechanism unit 2 and output distributing mechanism unit 3 configured as described above are connected in such a manner that the output gear shaft 22c in the speed reduction mechanism unit 2 is connected to the input side end of the main driving shaft 31 in the output distributing mechanism unit 3 by only the output shaft joint 4a. In the speed reduction mechanism unit 2, the input side end of the main input shaft 25 is connected to the constant speed main motor 1A through the first shaft joint 4, and the input side end of the auxiliary input shaft 29 is connected to the auxiliary motor 8 with a variable speed through the second shaft joint 6. Further, in the distributor casing 3A of the output distributing mechanism unit 3A, the output side is connected to the twin screw type extruder 10; the output side end of the main driving shaft 31 is connected to a first screw 11 through a main driving shaft joint 13; and the output side end of the auxiliary driving shaft 32 is connected to a second screw 12 through an auxiliary driving shaft joint 14.

The drive apparatus configured as described above operates as follows. First, prior to the operation, in the speed reduction mechanism unit 2, the auxiliary input locking device 9 is locked to place the auxiliary motor 8 in a rotation stopped state. The main input locking device 28 is opened to place the main input shaft 25 in a rotation permissible state. The switching lever 27 is operated so that either desired one of the first intermediate gear 24a and the second intermediate gear 24b. For example, the first intermediate gear 24a is integrated with the intermediate gear shaft 24 by the switching cam mechanism 26 to set it at one speed reduction ratio. By turning on the auxiliary input locking device 9 before the preliminary speed reduction mechanism 2B, the sun gear 23 is placed in a locked state.

Next, the main motor 1A is actuated for running. The driving force with the constant speed rotation of the main motor 1A rotationally drives the main input shaft 25 through the first shaft joint 4. The main input shaft 25 rotationally drives the intermediate gear shaft 24 through the first main input gear 25a and first intermediate gear 24a. The intermediate gear shaft 24 rotationally drives the hollow gear 21 through the third intermediate gear 24c. The plurality of planetary gears 22 in mesh with the internal gear teeth of the rotating hollow gear 21 and the stopped sun gear 23 rotate around their center of the shafts supported by the planetary frame 22a and so pivot along the outer periphery of the sun gear 23, thereby rotationally driving the planetary frame 22a. Thus, the output side end 22b of the planetary frame 22a rotationally drives the main driving shaft 31 of the output distributing mechanism unit 3 through the output gear shaft 22c and output shaft joint 4a. In the meantime, the main driving shaft 31 is rotated a fewer number of times than the revolutions of the main motor 1A by means of the ratios between the number of teeth of the first main input gear 25a and first intermediate gear 24a and between the third intermediate gear 24c and hollow gear 21, and the speed reduction by the planetary gears 22 among the hollow gear 21, planetary gears 22 and sun gear 23.

Next, in the output distributing mechanism unit 3, the main driving shaft 31 rotationally drives the intermediate driving shaft 33 through the first driving gear 31a and second driving gear 33a. The intermediate driving shaft 33 rotationally drives the auxiliary driving shaft 32 through the fourth driving gear 32a via the third driving gear 33b, the first driving intermediate gear 34a, and second driving intermediate gear 34b, or the third driving intermediate gear 34c and fourth driving intermediate gear 34d. Meanwhile, the first driving gear 31a and second driving gear 33a have the same number of teeth; the third driving gear 33b and fourth driving gear 32a have the same number of teeth; the first driving intermediate gear 34a and second driving intermediate gear 34b have the same number of teeth; and the third driving intermediate gear 34c and fourth driving intermediate gear 34d have the same number of teeth. For this reason, the main driving shaft 31 and auxiliary driving shaft 32 are rotated the same number of times in the same direction.

The output side end of the main driving shaft 31 is connected to the first screw 11 of the twin screw type extruder 10 through the main driving shaft joint 13; and the output side end of the auxiliary driving shaft 32 is connected to the second screw 12 through the auxiliary driving shaft joint 14. The first screw 11 and second screw 12 are thereby rotationally driven. The first screw 11 and second screw 12 melt, knead, and extrude the synthetic resin material out the end of the twin screw type extruder 10, i.e. the rightward direction in FIG. 1. Thus, their reaction forces act on the main driving shaft 31 and auxiliary driving shaft 32 in the leftward direction in FIG. 1. These reaction forces are borne by the main driving shaft thrust bearing 35 and auxiliary driving shaft thrust bearing 36, respectively.

When the speed change ratio is changed slightly, the auxiliary input locking device 9 is opened to actuate the auxiliary motor 8 for its running. The rotationally driving force of the auxiliary motor 8 rotationally drives the sun gear 23 through the second shaft joint 6, preliminary speed reduction mechanism 2B and third shaft joint 6a. The plurality of planetary gears 22, which are in mesh with the internal gear teeth of the rotating hollow gear 21 and the stopped sun gear 23 and rotationally drive the planetary frame 22a, change their pivoting speed, i.e. speed reduction ratio when the sun gear 23 rotates. Thus, the number of revolutions of the planetary frame 22a is changed. The changed number of revolutions of the planetary frame 22a is given to the first screw 11 and the second screw 12 of the twin screw type extruder 10 through the output shaft joint 4a and output distributing mechanism unit 3 from the speed reduction mechanism unit 2. The auxiliary motor 8 has a variable speed and so selects the number of revolutions corresponding to the number of revolutions necessary for the twin screw type extruder 10.

Figure 3:
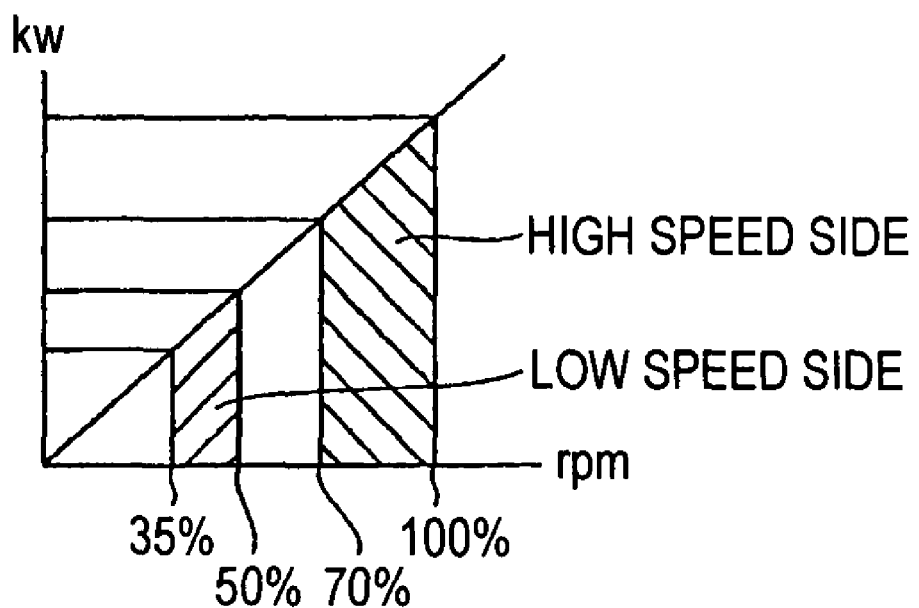
FIG. 3 shows a graph showing a running range of the drive apparatus according to the present invention.

When the speed change ratio is to be changed greatly, correspondingly to the requirement from the twin screw type extruder 10, the main motor 1A and auxiliary motor 8 are put in their stopped state as needed, the switching lever 27 is operated so that the combination of connected gears between the main input shaft 25 and the intermediate gear shaft 24 is changed. For example, where the first intermediate gear 24a has been integrated with the intermediate gear shaft 24 so that the first intermediate gear 24a is connected to the first main input gear 25a, the first intermediate gear 24a is released from the intermediate gear shaft 24 and the second intermediate gear 24b is integrated with the intermediate gear shaft 24. As a result, the driving force due to the constant speed rotation of the main motor 7 rotationally drives the hollow gear 21 with a new speed change ratio through the second main input gear 25b and second intermediate gear 24b. Also, even with such a greatly changed speed change ratio, by actuating the auxiliary motor 8 as described above, the speed change ratio can be likewise changed slightly as needed. An example of a running range of such drive apparatus is shown in FIG. 3.

Figure 4:
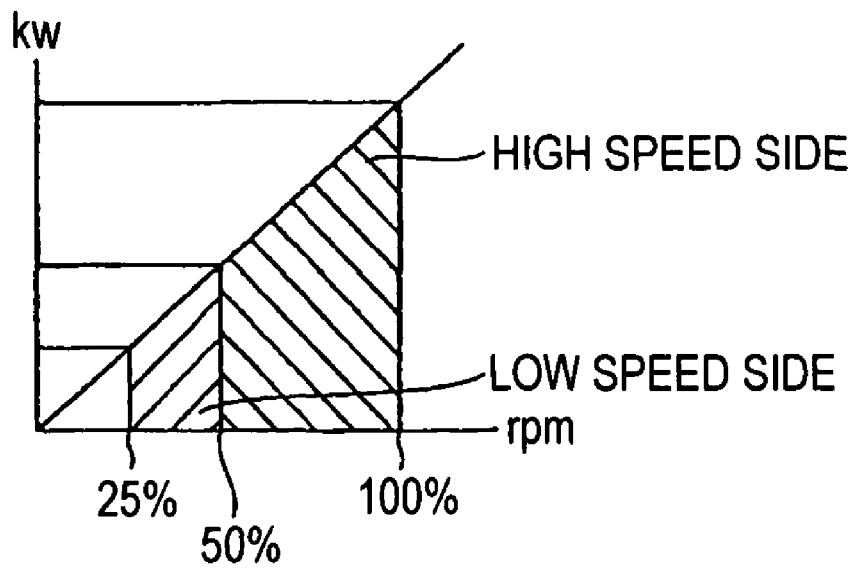
FIG. 4 shows another graph showing a running range of the drive apparatus according to the present invention.

Further, when the speed change ratio has been changed greatly and an intermediate speed change ratio and one outside the change ratios is continuously changed by the auxiliary motor 8, the speed change ratio continuing to change over a wide range can be obtained as shown in FIG. 4. As a result, the screw type extruder 10 can be operated in a wide range of the screw rotation rates. Thus, various grades of synthetic resin materials with different physical properties can be extrusion-molded. Further, such drive apparatus may be compatible with a fully variable motor.

Figure 5:
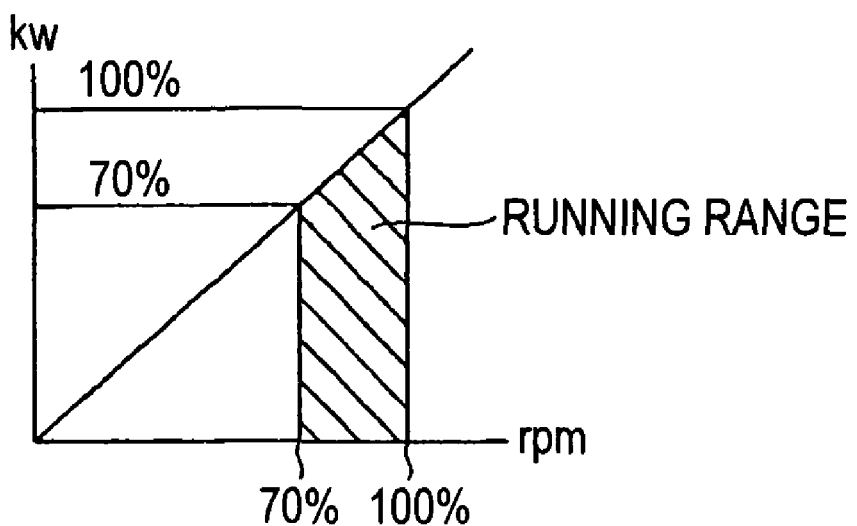
FIG. 5 shows a graph showing the running range of a related motor.

As described above, the speed change ratio can be freely changed by the switching lever 27. Therefore, as a result of experiments, as shown in FIGS. 3 and 4, the range of running can be greatly improved as compared with the characteristics of the related art shown in FIG. 5.

What is claimed is:

1. A drive apparatus for an extruder comprising:
   a speed reduction mechanism unit comprising a planetary gear speed reduction mechanism, the planetary gear speed reduction mechanism including:
   a hollow gear connected in mesh with a main input shaft connected to a main motor on an outer periphery of the planetary gear speed reduction mechanism through a gear ratio changing mechanism, wherein a gear ratio of the gear ratio changing mechanism can be selectively switched to change a speed of the hollow gear;
   a sun gear;
   a supporting shaft of the sun gear which constitutes an auxiliary input shaft connected to an auxiliary motor; and
   a planetary frame of planetary gears which constitutes an output shaft;
   an output distributing mechanism unit, which is separated from the speed reduction mechanism unit, and which comprises a screw; and
   an output shaft joint connecting the speed reduction mechanism unit and the output distributing mechanism unit;
   wherein the gear ratio changing mechanism comprises:
   an intermediate gear shaft and the main input shaft that are arranged in parallel to a center of a shaft of the hollow gear;
   a first intermediate gear, a second intermediate gear and a third intermediate gear;
   a first main input gear and a second main input gear that are mounted on the main input shaft;
   a switching cam mechanism arranged between the first intermediate gear and the second intermediate gear; and
   a switching lever that is connected to the switching cam;
   wherein the first intermediate gear and the second intermediate gear are respectively meshed with the first main input gear and the second main input gear;
   wherein the third intermediate gear is mounted on the intermediate gear shaft and is meshed with the hollow gear;
   wherein the first gear ratio between the first intermediate gear and the first main input gear is different from a second gear ratio between the second intermediate gear and the second main input gear;
   wherein the intermediate gear shaft is capable of being fixed to or released from the first intermediate gear and the second intermediate gear such that the intermediate gear shaft is selectively connected to the first intermediate gear or the second intermediate gear by the switching cam mechanism operated by the switching lever;
   wherein the main motor for driving the screw has a constant speed; and
   wherein the auxiliary motor for driving the sun gear has a variable speed.

2. The drive apparatus for an extruder according to claim 1, wherein the intermediate gear and the second intermediate gear are spline-connected to the intermediate gear shaft such that they are movable in a shaft direction thereof 3. The drive apparatus for an extruder according to claim 1, wherein the gear ratio changing mechanism is provided outside the planetary gear system speed reduction mechanism.

4. The drive apparatus for an extruder according to claim 1, wherein the output shaft joint connects the output shaft of the speed reduction mechanism unit and the output distributing mechanism unit.

5. The drive apparatus for an extruder according to claim 4, wherein the output distributing mechanism unit comprises a main driving shaft, and
wherein the output shaft joint connects the output shaft of the speed reduction mechanism unit and the main driving shaft of the output distributing mechanism unit.

6. A drive apparatus for an extruder comprising:
a planetary gear speed reduction mechanism comprising:
   a sun gear;
   a plurality of planetary gears meshed with the sun gear; and
   a hollow gear, wherein the hollow gear has teeth on an inner surface that mesh with the plurality of planetary gears, and teeth on an outer surface;
   a planetary gear frame connecting the plurality of planetary gears to an output shaft;
a main input shaft connected to a main motor having a constant speed;
wherein the main input shaft is linked to the teeth on the outer surface of the hollow gear through a gear ratio changing mechanism;
wherein the gear ratio changing mechanism is configured to be selectively switched to change a speed of the hollow gear;
wherein the gear ratio changing mechanism comprises:
   an intermediate gear shaft and the main input shaft that are arranged in parallel to a center of a shaft of the hollow gear;
   a first intermediate gear, a second intermediate gear, and a third intermediate gear;
   a first main input gear and a second main input gear that are mounted on the main input shaft;
   a switching cam mechanism arranged between the first intermediate gear and the second intermediate gear; and
   a switching lever that is connected to the switching cam;
wherein the first intermediate gear and the second intermediate gear are respectively meshed with the first main input gear and the second main input gear;
wherein the third intermediate gear is mounted on the intermediate gear shaft and is meshed with the hollow gear;
wherein a first gear ratio between the first intermediate gear and the first main input gear is different from a second gear ratio between the second intermediate gear and the second main input gear;
wherein the intermediate gear shaft is capable of being fixed to or released from the first intermediate gear and the second intermediate gear such that the intermediate gear shaft is selectively connected to the first intermediate gear or the second intermediate gear by the switching cam mechanism operated by the switching lever and an auxiliary input motor having a variable speed connected to the sun gear by an auxiliary input shaft.

* * * * *